Jan. 8, 1963 R. H. EISENGREIN 3,072,836
INDEX TABLE CONTROL SYSTEM
Filed June 16, 1960 2 Sheets-Sheet 1
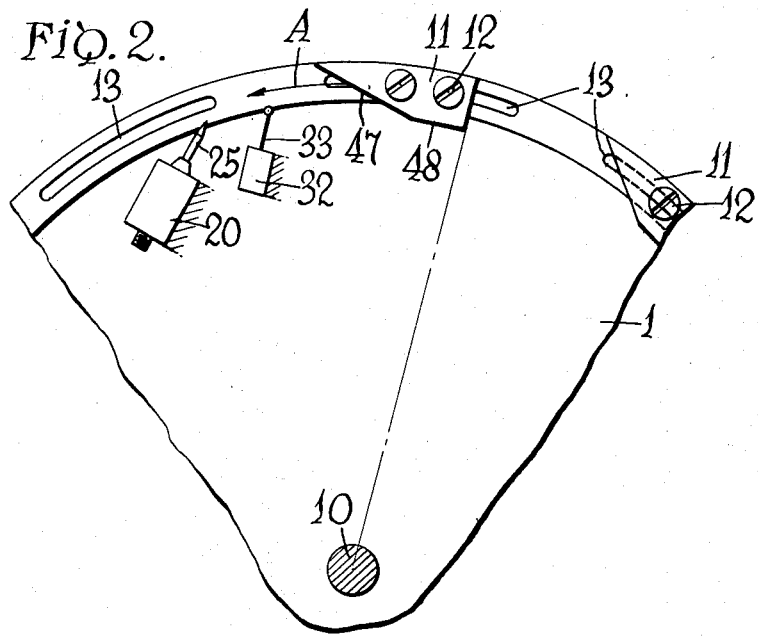
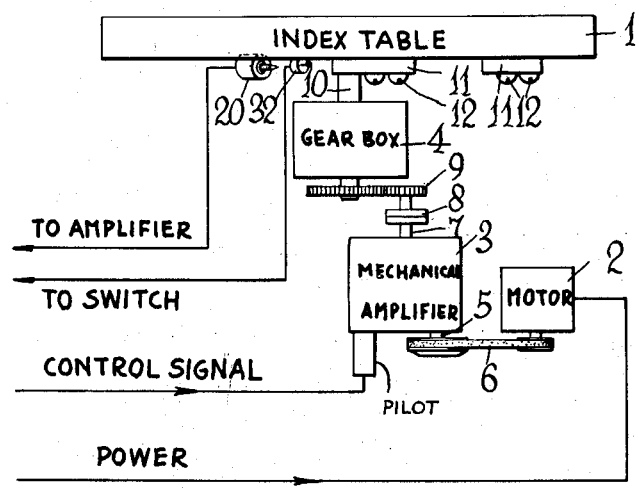
INVENTOR
Robert H. Eisengrein,
BY
Bean, Brooks, Buckley & Bean
ATTORNEYS United States Patent Office 3,072,836
Patented Jan. 8, 1963

3,072,836
INDEX TABLE CONTROL SYSTEM
Robert H. Eisengrein, Skaneateles, N.Y., assignor to Seneca Falls Machine Company, Seneca Falls, N.Y.
Filed June 16, 1960, Ser. No. 36,539
11 Claims. (Cl. 318—467)

This invention relates generally to the control art, and more particularly to a new and useful control system for an index table.

Index tables are customarily positioned by mechanical means, such as a Geneva motion device. This has the disadvantage that, once the mechanism has been designed, the table is good for only a fixed number of positions.

The primary object of this invention is to provide an index table control system in which the number and spacing of the index stations can be selectively varied, while at all times obtaining accurate positioning at the selected index stations.

Another object of my invention is to accomplish this in a relatively simple and inexpensive manner.

In one aspect thereof, the control system of my invention is characterized by the provision of an index table having an index station defining stop, a variable speed drive for the table, electric signal responsive control means for the drive, and an energizing circuit for the drive control means, the energizing circuit including a first control signal generating means for generating a normal drive signal, and a second control signal generating means for generating an approach drive signal, the second signal generating means including means for generating a signal which is variable in response to movement of a stylus positioned in the path of the stop for being moved thereby from an extended position to an index position as the table approaches the index station, the stylus normally being biased to its extended position, with means normally connecting the drive control means to the first signal generating means for driving the table between stations in response thereto, and means for switching the drive control means from the first signal generating means to the second signal generating means for driving the table at index station approach speed, the switching means including an actuator positioned in the path of the stop ahead of the stylus whereby the switching actuator is engaged by the stop prior to engagement thereof with the stylus.

The foregoing and additional objects, advantages and characterizing features of a control system constructed in accordance with my invention will become clearly apparent from the ensuing detailed description of an illustrative, presently contemplated embodiment thereof, taken in conjuction with the accompanying drawings forming a part hereof, wherein like reference numerals denote like parts throughout the various views and wherein:

FIG. 1 is a diagrammatic side elevational view of an index table incorporating the control system of my invention;

FIG. 2 is a fragmentary, bottom plan view thereof; and

Figure 3:
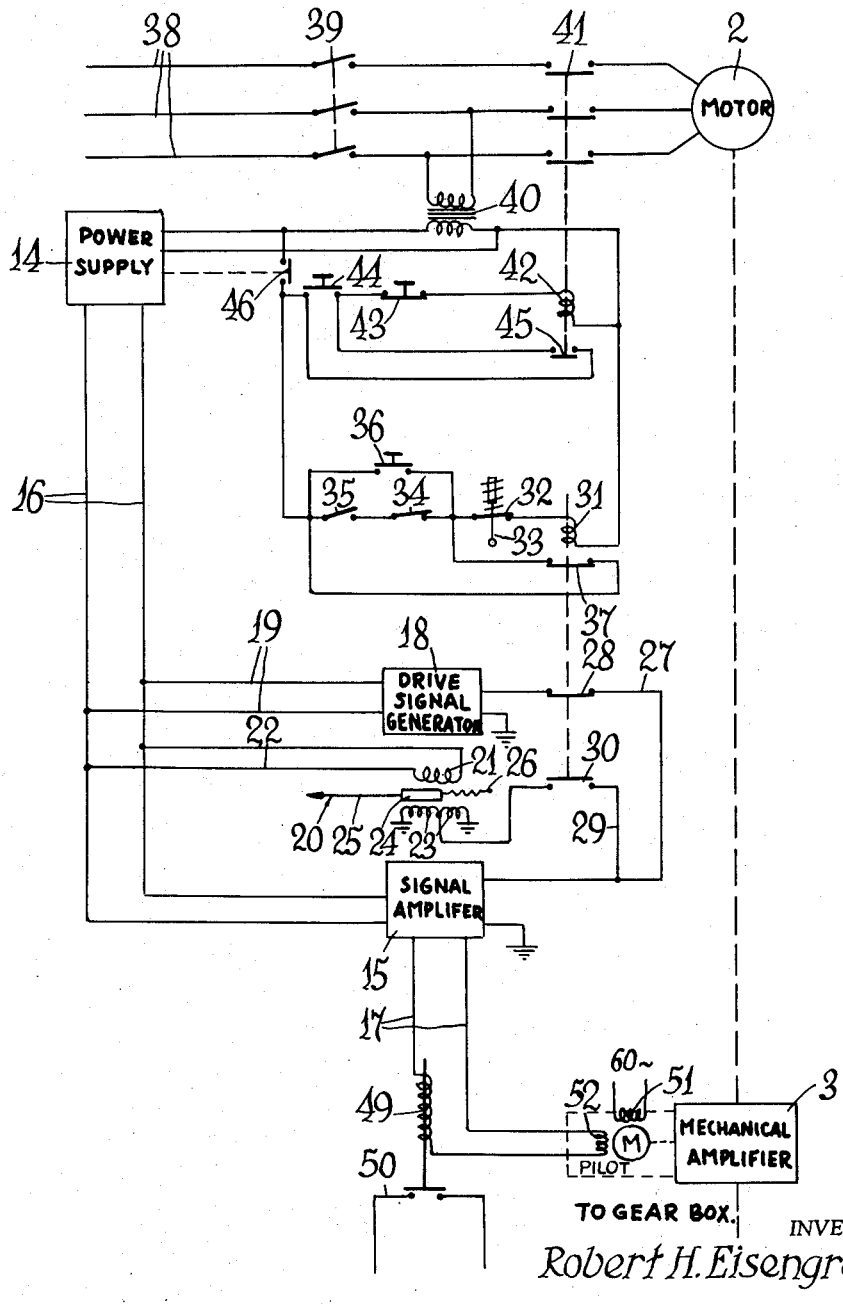
FIG. 3 is a schematic wiring diagram for my control system.

While my control system is by no means limited thereto, the accompanying drawing illustrates a rotary index table 1 driven by an electric motor 2 through a mechanical amplifier 3 and gear box 4. The amplifier 3 can be of a type similar to that illustrated in United States Patents 2,585,507, 2,569,585 and 2,569,586, having a continuously rotating power input shaft 5 driven by motor 2 through a Gilmer drive 6, and incorporating a relatively small pilot or control device for selectively causing input shaft 5 to rotate an output shaft 7. The pilot control device incorporates a variable speed control for rotating the output shaft 7 at different speeds. Output shaft 7 is connected to gear box 4 through a slip clutch 8 and gears 9, the slip clutch 8 being provided so that if the table or its drive becomes locked, the motor 2 and amplifier 3 will not be damaged. Gear box 4 drives table 1 through shaft 10. Motor M is a reversible servo motor like motor M' in the patents referred to above, but with a constantly excited field coil 51, and a variably excited field control winding 52 energized by amplifier 15.

Tabe 1 carries one or more stop members 11 which are adjustably and removably secured thereto by any desired means, such as for example the bolt 12 engaging in arcuate slots 13. The stop securing arrangement is such that the stop members 11 can be moved toward and away from one another, and can be selectively added to or removed from the table 1, thereby to selectively vary the number of index stations and the relative spacing therebetween.

The control system of my invention is designed to cause the table to be driven at a normal drive speed between index stations and then, as the table approaches an index station, to switch to a decelerating, approach speed. When the table arises at the index station, the drive becomes inoperative until the desired operation has been performed on the work carried by the table.

To this end, the drive control amplifier 3 is provided with an energizing circuit which includes a power supply 14 connected to a signal amplifier 15 by leads 16, the signal amplifier being connected to mechanical amplifier 3 by leads 17. The energizing circuit for mechanical amplifier 3 also includes a first control signal generating means comprising a drive signal generator 18 which can be of any desired type comprising, for example, a simple transformer in the illustrated embodiment, designed to produce a forward drive control signal causing amplifier 3 to drive table 1 at the desired maximum speed for the major portion of its movement between stations. Drive signal generator 18 is energized from power supply 14 through leads 19 connected to the leads 16. The mechanical amplifier energizing circuit also includes a second control signal generating means in the form of a transducer generally designated 20 and adapted to provide a variable signal causing amplifier 3 to decelerate table 1 and to stop it at the index station.

Transducer 20 comprises a linearly variable transformer having a primary coil 21 energized from power supply 14 through leads 16 and 22, and opposed secondary coils 23 arranged so that when the movable core 24 is centered between coils 21, 23 in null position, the secondary voltages cancel out resulting in a zero output signal. Core 24 is connected to a stylus 25, for movement therewith, and is normally biased into an extended, out of null position by a spring 26.

The drive signal generator 18 is connected to signal amplifier 15 by a lead 27 and switch 28. Transducer 20, comprising the approach signal generator, is connected to the signal amplifier through a lead 29 and switch 30. Switches 28 and 30 are ganged or otherwise so arranged that whenever one of them is open, the other is closed, and vice versa, whereby only one of the signal generators 18, 20 is connected to the amplifier at any given time. Thus, amplifier 3 receives either the drive control signal or the approach control signal.

The switches 28, 30 are actuated by a relay 31 having an energizing circuit including a normally closed limit switch 32, connected to an actuator 33 for a purpose to be described, a switch 34 which is opened for manual operation and closed for automatic operation, and an intermittently operated limit switch 35. A manually operated index switch 36 is provided, in by-pass relation to the series arranged switches 34, 35, and a holding circuit including a switch 37 also actuated by relay 31 is provided to lock in the relay energizing circuit, once it is closed.

Power is derived from a three phase supply, generally designated 38, through a power switch 39 and a transformer 40. The motor 2 is energized by the supply 38 through a switch 41 controlled by a relay 42. Relay 42 has an energizing circuit including a normally closed stop switch 43 and a normally open start switch 44 bridged by a holding circuit including a switch 45 actuated by relay 42 for locking in its energizing circuit once it is closed. The power supply 14 has a time delay switch 46 for closing the energizing circuit of relays 31, 42 after signal amplifier 15 is warmed up.

The stylus 25 of transducer 20 is appropriately mounted to be engaged by the stop 11, for being moved thereby into the null or centered position of the transducer. The actuator 33 of limit switch 32 is similarly positioned in the path of the stops 11, except that actuator 33 is positioned sufficiently ahead of stylus 25 so that it will be actuated prior to actuation of the transducer stylus 25. For example, if the transducer 20 is located at a 15 inch radius, the switch actuator 33 should contact the stops 11 approximately 3 inches before the transducer stylus 25 contacts them. To minimize shock to the stylus 25 and actuator 33, each stop is provided with a cam surface 47 having a gradual rise, and the constant height portion 48 of the cam is sufficiently wide to insure that the switch 32 will open the energizing circuit to relay 31 long enough to cause the latter to drop out and thereby switch the drive contact amplifier 3 to the approach speed generator 20.

In operation, assume that the necessary work has been performed at a particular index station. Switch 35 is momentarily closed by any appropriate means, either manual or automatic, to energize relay 31 which moves the switches 37, 28, 30 to the position shown in FIG. 3. This connects the drive signal generator 18 to amplifier 3, causing the index table 1 to rotate in the direction of the arrow A (FIG. 2). As the index table approaches the next index station, the actuator 33 of switch 32 is engaged by the stop member 11 corresponding to that index station. This causes switch 32 to open, thereby deenergizing relay 31 to open the relay holding circuit, and to open switch 28 while closing switch 30. The drive control signal then is derived from the transducer 20 which is arranged to provide a slower speed signal so that the table immediately begins to decelerate. Then, the cam face 47 of the stop member 11 engages stylus 25 and moves core 24 toward its null position, steadily decreasing the control signal until the core is centered and there is no resulting signal. The absence of a control signal causes amplifier 3 to stop the drive, and relay 49 actuates a signal circuit 50, which can be of any desired type, to indicate that the index table is at the index station ready for the next operation to be performed on the work carried thereby. When the operation has been completed, switch 35 will again momentarily close to energize relay 31, and the above-described operation repeats itself.

Stylus 25 is on the cam slope 47 of the stop 11, when the transducer is in its null position, and the core 24 is forced further into the transducer housing when the table stop is forced past the transducer. Also, it will be appreciated that actuator 33 passes beyond the constant height portion 48 of stop member 11, before the transducer 20 reaches its null position, thereby conditioning the energizing circuit of relay 31 for subsequent energization of the relay upon closure of switch 35. At the same time, the constant height portion 48 should be wide enough to insure that switch 32 will be actuated long enough for the relay 31 to deenergize.

For manual operation, the switch 34 is opened. Assuming that the start switch 44 has been closed to energize motor 2, and also assuming that the system is not nulled against a stop 11, the table will immediately move toward the next station at a slow speed because relay 31 has been deenergized. When the stop 11 has moved the transducer core 24 to its null position, the table will stop. The position of stop 11 then can be adjusted to obtain the exact position required for that index station. Null relay 49 will indicate when the system is zeroed on a stop, because it will be deenergized when the transducer 20 is in its null position. Once that particular stop has been positionally adjusted, to define the desired index station, the switch 36 is momentarily closed to energize relay 31 which switches the system to the drive signal generator 18, causing the table to drive toward the next station at a relatively rapid rate. As the succeeding stop 11 engages the actuator 33 it opens switch 32 to deenergize relay 31, causing the table to move at a station approach speed, and to finally stop, under the control of transducer 20. In this way, each stop 11 can be positionally adjusted, to provide the desired location and spacing of the index stations.

Accordingly, it is believed that my invention fully accomplishes its intended objects. I estimate that this control system will position a point on the circumference of a 60 inch index table to within plus or minus .003 inch, that it will index the table at 1000 indexes per hour, and that it will index the table 60° in approximately 1.5 seconds. Obviously, any number of table stops can be used, to obtain various indexing combinations.

If the table should happen to move through the index station, it will drive the stylus 25 beyond its null position, causing the table drive to reverse and return the table to the precise index station.

While I have disclosed and described but one embodiment of my invention, this has been done by way of illustration only, without thought of limitation.

Having fully disclosed and completely described my invention, and its mode of operation, what I claim as new is:

1. An index table, an index station defining stop carried by said table, a variable speed drive for said table, electric signal responsive control means for said drive, an energizing circuit for said control means, said energizing circuit including first control signal generating means for generating a normal drive signal, and second control signal generating means for generating an approach drive signal, said second signal generating means including a movable stylus positioned in the path of said stop for being moved thereby from an extended position to an index position upon arrival of said table at said index station and means generating a signal variable in response to movement of said stylus, means biasing said stylus to said extended position, means normally connecting said electric signal responsive drive control means to said first signal generating means for driving said table toward said index station in response thereto, and means for switching said control means from said first signal generating means to said second signal generating means for driving said table at index station approach speed, said switching means including an actuator positioned in the path of said stop ahead of said stylus for being engaged by said stop prior to engagement thereof with said stylus.

2. The combination of claim 1, wherein said stop is adjustably connected to said table for selectively varying the position of the index station defined thereby.

3. The combination set forth in claim 1, wherein said second signal generating means includes a linearly variable transformer having a core operatively connected to said stylus for being moved thereby.

4. The combination set forth in claim 3, together with means including a signal responsive relay arranged to indicate when said table is at said index station.

5. The combination set forth in claim 4, wherein said energizing circuit includes a signal amplifier, and said relay is operatively connected to said energizing circuit between said signal amplifier and said control means.

6. The combination set forth in claim 1, wherein said connecting means includes a relay arranged when energized to connect said control means to one of said first and second signal generating means and when deenergized to connect said control means to the other of said signal generating means, and wherein said switching means includes a switch arranged in controlling relation to the energizing circuit for said connecting relay means.

7. An index table, multiple index station defining stops carried by said table, a variable speed drive for said table, electric signal responsive control means for said drive, an energizing circuit for said drive control means including first and second control signal generating means, said first control signal generating means generating a normal drive signal, said second control signal generating means including a stylus positioned in the path of said stops for being moved by successive ones thereof from an extended position and means generating an index station approach drive signal variable in response to movement of said stylus, means biasing said stylus to said extended position, means normally connecting said drive control means to said first signal generating means for driving said table in response thereto, and means for switching said drive control means from said first signal generating means to said second signal generating means for driving said table at index station approach speed, said switching means including an actuator positioned in the path of said stops ahead of said stylus for being engaged by successive stops prior to engagement thereof with said stylus.

8. The combination set forth in claim 7, wherein said stops are releasably, adjustably connected to said table for selectively varying the number and spacing of said index stations.

9. The combination set forth in claim 7, wherein said connecting means includes relay means having an energizing circuit and arranged when energized to connect said drive control means to one of said control signal generating means and when deenergized to connect said drive control means to the other of said control signal generating means, and wherein said switching means includes a switch in controlling relation to the energizing circuit of said connecting relay means.

10. The combination set forth in claim 9, wherein said switching means actuator is disengaged by successive stops prior to movement of said stylus to said index position.

11. An index table, multiple index station defining stops, means releasably connecting said stops to said table for positional adjustment relative thereto and to each other to vary the number and position of index stations, a variable speed drive for said table, electric signal responsive control means for said drive, an energizing circuit for said drive control means, said energizing circuit including first and second control signal generating means, said first control signal generating means generating a normal drive signal, said second control signal generating means including a stylus positioned in the path of said stops for being moved by successive ones thereof from an extended position to an index position and means generating an index station approach drive signal variable in response to movement of said stylus, means biasing said stylus to said extended position, means normally connecting said drive control means to said first signal generating means for driving said table in response thereto, said connecting means including relay means having an energizing circuit and arranged when energized to connect said drive control means to said first signal generating means and when deenergized to connect said drive control means to said second control signal generating means, switching means including a normally closed switch in controlling relation to said relay energizing circuit and an actuator positioned in the path of said stops ahead of said stylus for being engaged by successive stops to open said relay energizing circuit prior to engagement thereof with said stylus, said switch actuator being disengaged by said successive stops prior to movement of said stylus to said index position, intermittently actuated switch means for momentarily reclosing said relay energizing circuit, and a holding circuit for said relay energizing circuit in by-pass relation to said intermittently actuated switch means.

References Cited in the file of this patent

UNITED STATES PATENTS

| | | |
|---|---|---|
| 2,440,916 | Rusnak et al. | May 4, 1948 |
| 2,686,283 | Stephan | Aug. 10, 1954 |
| 2,807,175 | Tandler et al. | Sept. 24, 1957 |
| 2,923,210 | Roberts | Feb. 2, 1960 |
| 2,927,483 | Turner | Mar. 8, 1960 |